(12) United States Patent
Chan

(10) Patent No.: US 11,102,205 B2
(45) Date of Patent: Aug. 24, 2021

(54) SYSTEM FOR REMOTELY CONTROLLING A DOCUMENT

(71) Applicant: Charles Lap San Chan, Taipei (TW)

(72) Inventor: Charles Lap San Chan, Taipei (TW)

( * ) Notice: Subject to any disclaimer, the term of this patent is extended or adjusted under 35 U.S.C. 154(b) by 369 days.

(21) Appl. No.: 16/246,733

(22) Filed: Jan. 14, 2019

(65) Prior Publication Data

US 2019/0356663 A1 Nov. 21, 2019

(30) Foreign Application Priority Data

May 21, 2018 (TW) .................................. 107117288

(51) Int. Cl.
*H04L 29/06* (2006.01)
*H04L 29/08* (2006.01)
*H04W 88/02* (2009.01)

(52) U.S. Cl.
CPC .............. *H04L 63/10* (2013.01); *H04L 63/08* (2013.01); *H04L 67/141* (2013.01); *H04L 67/42* (2013.01); *H04W 88/02* (2013.01)

(58) Field of Classification Search
CPC ....... H04L 63/10; H04L 67/141; H04L 63/08; H04L 67/42; H04L 63/0876; H04L 67/143; H04L 67/04; H04W 88/02

USPC ............................................................ 726/7
See application file for complete search history.

(56) References Cited

U.S. PATENT DOCUMENTS

2006/0053196 A1* 3/2006 Spataro ................. H04L 65/403
709/205
2017/0116375 A1* 4/2017 Kuwayama ......... G06F 21/6209

* cited by examiner

*Primary Examiner* — Tu T Nguyen
(74) *Attorney, Agent, or Firm* — Muncy, Geissler, Olds & Lowe, P.C.

(57) ABSTRACT

A system for remotely controlling a document includes a server, an intelligent mobile device, and a first client device. The server stores a first identification datum corresponding to the intelligent mobile device and at least a second identification datum corresponding to the first client device. The intelligent mobile device and the first client device respectively installed with a remote control client APP program and a first customer client APP program. The intelligent mobile device uses the remote control client APP program to set up a user permission of an electronic document. The intelligent mobile device uses the remote control client APP program to transmit the electronic document to the server according to the second identification datum. The first client device uses the first customer client APP program to download the electronic document from the server and control the electronic document according to the user permission.

19 Claims, 5 Drawing Sheets

| the intelligent mobile device actively executes the remote control client APP program to display the content of the electronic document and uses the remote control client APP program, the server, and the first customer client APP program to create and transmit a first attending request to the first client device according to the second identification datum, thereby establishing a first on-line session | ~S18 |

↓

| the first client device executes the first customer client APP program to display the content of the electronic document and uses the first customer client APP program, the server, and the remote control client APP program to transmit a first accepting message to the intelligent mobile device according to the first identification datum when the first client device accepts the first attending request. The intelligent mobile device uses the second identification datum to attend the first on-line session according to the first accepting message | ~S20 |

↓

| the intelligent mobile device uses a first control command to display the image corresponding to the first control command and uses the remote control client1 APP program, the server, and the first customer client APP program to transmit the first control command to the first client device according to the second identification datum, such that the first client device displays the image of the electronic document corresponding to the first control command | ~S22 |

↓

| the first client device uses the first customer client APP program, the server, and the remote control client APP program to transmit a first display message to the intelligent mobile device according to the first identification datum | ~S24 |

↓

| the intelligent mobile device uses the remote control client APP program, the server, and the first customer client APP program to transmit a terminating message to the first client device according to the second identification datum, so as to close the window of the electronic document displayed by the first client device after the intelligent mobile device closes the window of the electronic document displayed by the intelligent mobile device to terminate the first on-line session | ~S26 |

↓

| the first client device uses the first customer client APP program, the server, and the remote control client APP program to transmit a responding message to theintelligent mobile device according to the first identification datum | ~S28 |

Fig. 3

SYSTEM FOR REMOTELY CONTROLLING A DOCUMENT

This application claims priority for Taiwan patent application no. 107117288 filed on May 21, 2018, the content of which is incorporated by reference in its entirety.

BACKGROUND OF THE INVENTION

Field of the Invention

The present invention relates to a control system, particularly to a system for remotely controlling a document.

Description of the Related Art

With the improvement of communication technology, communication among people is limited by space no more. Even if one person is distant from another person, they can communicate with each other using various communication technologies and communication equipment. When the communication technology was not developed before, participants had to reach a predetermined site to hold a session. Nowadays, the voices and images of participants are converted into digital signals to form a data stream by electronic equipment, and then the data stream is transmitted to the other participants using the network technology. Holding a session becomes flexible when various communication technologies and their protocols are used.

Although some electronic documents are transmitted to smart phones of participants using the network technology, the electronic documents are classified documents not used by anyone. However, when the electronic document is transmitted using communication software, the communication software cannot set the user permission of the electronic document. Thus, anyone that has the communication software obtains and edits the electronic document. Even if the electronic document is encrypted using other software, the user still needs a password to decrypt the electronic document. That is to say, the password is transmitted and revealed using the communication software to reduce the security of the electronic document.

To overcome the abovementioned problems, the present invention provides a system for remotely controlling a document, so as to solve the afore-mentioned problems of the prior art.

SUMMARY OF THE INVENTION

The primary objective of the present invention is to provide a system for remotely controlling a document, which uses a remote control client APP program to set the user permission and its priority of an electronic document, thereby enhancing the security of the electronic document.

To achieve the abovementioned objectives, the present invention provides a system for remotely controlling a document, which comprises a server, an intelligent mobile device, and at least a first client device. The server stores a first identification datum and at least a second identification datum. The intelligent mobile device is installed with a remote control client APP program that is able to verify the first identification datum. When the intelligent mobile device uses the remote control client APP program and the first identification datum to successfully login to the server, the server returns the second identification datum to the intelligent mobile device. The intelligent mobile device uses the remote control client APP program to set up the user permission of an electronic document and create a first share request, and the intelligent mobile device uses the remote control client APP program to transmit the electronic document and the first share request to the server according to the second identification datum. The first client device is installed with a first customer client APP program that is able to verify the second identification datum. When the first client device uses the first customer client APP program and the second identification datum to successfully login to the server and accepts the first share request, the server returns the first identification datum to the first client device. The first client device uses the first customer client APP program to verify the first identification datum, thereby downloading the electronic document from the server and controlling the electronic document according to the user permission.

In an embodiment of the present invention, the electronic document is a presentation file, a portable document format (PDF) document, an image, a spreadsheet, a text document, or a scanned document.

In an embodiment of the present invention, the intelligent mobile device actively executes the remote control client APP program to display a content of the electronic document and uses the remote control client APP program, the server, and the first customer client APP program to create and transmit a first attending request to the first client device according to the second identification datum, thereby establishing a first on-line session, the first client device executes the first customer client APP program to display the content of the electronic document and uses the first customer client APP program, the server, and the remote control client APP program to transmit a first accepting message to the intelligent mobile device according to the first identification datum when the first client device accepts the first attending request, and the intelligent mobile device uses the second identification datum to attend the first on-line session according to the first accepting message; and the content of the electronic document has images, after the intelligent mobile device uses the second identification datum to attend the first on-line session, the intelligent mobile device uses a first control command to display the image corresponding to the first control command, and uses the remote control client APP program, the server, and the first customer client APP program to transmit the first control command to the first client device according to the second identification datum, and the first client device displays the image corresponding to the first control command, and the first control command is not a picture.

In an embodiment of the present invention, the first control command is a previous page command, a next page command, or a command of jumping to a page.

In an embodiment of the present invention, the first control command is a previous page command, a next page command, or a command of jumping to a page.

In an embodiment of the present invention, the first client device uses the first customer client APP program, the server, and the remote control client APP program to transmit a first display message to the intelligent mobile device according to the first identification datum after the first client device displays the image corresponding to the first control command.

In an embodiment of the present invention, the intelligent mobile device uses the remote control client APP program, the server, and the first customer client APP program to transmit a terminating message to the first client device according to the second identification datum, so as to close a window of the electronic document displayed by the first client device after the intelligent mobile device closes a window of the electronic document displayed by the intelligent mobile device to terminate the first on-line session, and the first client device uses the first customer client APP program, the server, and the remote control client APP program to transmit a responding message to the intelligent mobile device according to the first identification datum after the first client device closes the window of the electronic document displayed by the first client device.

In an embodiment of the present invention, the system for remotely controlling the document further comprises at least a display electrically connected to the first client device, and the first client device projects the image of the electronic document to a screen of the display.

In an embodiment of the present invention, the system for remotely controlling the document further comprises at least a second client device installed with a second customer client APP program, when the user permission is a presentation mode, the server further stores at least a third identification datum, the second customer client APP program is able to verify the third identification datum, when the first client device uses the first customer client APP program and the second identification datum to successfully login to the server, the server returns the third identification datum to the first client device, the first client device uses the first customer client APP program to set up the user permission of the electronic document and create a second share request, and the first client device uses the first customer client APP program to transmit the electronic document and the second share request to the server according to the third identification datum, when the second client device uses the second customer client APP program and the third identification datum to successfully login to the server and accepts the second share request, the server returns the second identification datum to the second client device, and the second client device uses the second customer client APP program to verify the second identification datum, thereby downloading the electronic document from the server; the first client device executes the first customer client APP program to encrypt the user permission of the electronic document; the first client device actively executes the first customer client APP program to display the content of the electronic document and uses the first customer client APP program, the server, and the second customer client APP program to create and transmit a second attending request to the second client device according to the third identification datum, so as to establish a second on-line session, when the second client device accepts the second attending request, the second client device executes the second customer client APP program to display the content of the electronic document and uses the second customer client APP program, the server, and the first customer client APP program to transmit a second accepting message to the first client device according to the second identification datum, and the first client device uses the third identification datum to attend the second on-line session according to the second accepting message; after the first client device uses the third identification datum to attend the second on-line session, the first client device displays the image corresponding to a second control command and uses the first customer client APP program, the server, and the second customer client APP program to transmit the second control command to the second client device according to the third identification datum, the second client device displays the image corresponding to the second control command, and the second control command is not a picture; and after the second client device displays the image corresponding to the second control command, the second client device uses the second customer client APP program, the server, and the first customer client APP program to transmit a second display message to the first client device according to the second identification datum.

In an embodiment of the present invention, the system for remotely controlling the document further comprises at least a second client device installed with a second customer client APP program, when the user permission is a share mode, the server further stores at least a third identification datum, the second customer client APP program is able to verify the third identification datum, when the first client device uses the first customer client APP program and the second identification datum to successfully login to the server, the server returns the third identification datum to the first client device, the first client device uses the first customer client APP program to set up the user permission of the electronic document and create a second share request, and the first client device uses the first customer client APP program to transmit the electronic document and the second share request to the server according to the third identification datum, when the second client device uses the second customer client APP program and the third identification datum to successfully login to the server and accepts the second share request, the server returns the second identification datum to the second client device, and the second client device uses the second customer client APP program to verify the second identification datum, thereby downloading the electronic document from the server.

In an embodiment of the present invention, when the user permission is a read-only mode, the first client device executes the first customer client APP program to display the content of the electronic document at any time; and when the user permission is a session-only mode and the first on-line session is terminated, the first customer client APP program automatically deletes the electronic document stored in the first client device.

In an embodiment of the present invention, the second client device is a desktop, a smart phone, a tablet computer, or a notebook computer, and the first client device is a desktop, a smart phone, a tablet computer, or a notebook computer.

In an embodiment of the present invention, the remote control client APP program, the first customer client APP program, and the second customer client APP program are chatting application programs.

In an embodiment of the present invention, when the first on-line session progresses, the chatting programs execute chatting functions.

In an embodiment of the present invention, when the first on-line session progresses, the remote control client APP program or the first customer client APP program adjusts a size of a window of a corresponding the electronic document.

In an embodiment of the present invention, the user permission has a plurality of modes, the plurality of modes have different priorities, and two of the different priorities of the electronic document overwrite each other.

In an embodiment of the present invention, the user permission has a plurality of modes, the plurality of modes have different priorities, and only the low priority replaces the high priority.

In an embodiment of the present invention, the user permission has a plurality of modes, the plurality of modes have different priorities, and the first client device uses the first customer client APP program to maintain the priority of the electronic document that is firstly downloaded.

In an embodiment of the present invention, the intelligent mobile device executes the remote control client APP program to encrypt and embed the first identification datum, the second identification datum, and the uploading time into the electronic document.

In an embodiment of the present invention, the intelligent mobile device executes the remote control client APP program to set time to live (TTL) of the electronic document.

In an embodiment of the present invention, the intelligent mobile device executes the remote control client APP program to encrypt the user permission of the electronic document.

Below, the embodiments are described in detail in cooperation with the drawings to make easily understood the technical contents, characteristics and accomplishments of the present invention.

BRIEF DESCRIPTION OF THE DRAWINGS

FIG. 3 is a flowchart of an intelligent mobile device initiating and terminating an on-line session according to an embodiment of the present invention;

DETAILED DESCRIPTION OF THE INVENTION

Figure 1:
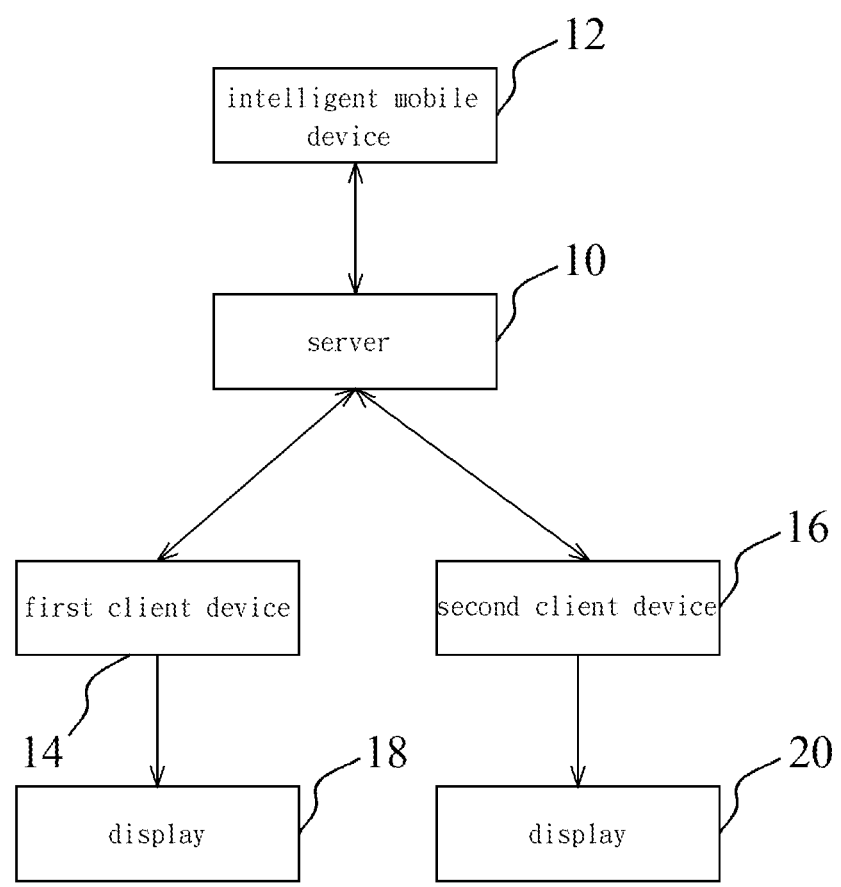
FIG. 1 is a diagram schematically showing a system for remotely controlling a document according to an embodiment of the present invention.

Refer to FIG. 1. The system for remotely controlling a document of the present invention is introduced as follows. The system for remotely controlling a document comprises a server 10, an intelligent mobile device 12, at least a first client device 14, at least a second client device 16, at least a display 18, and at least a display 20. In the embodiment, there are one first client device 14, one second client device 16, one display 18, and one display 20. The server 20 stores a first identification datum, at least a second identification datum, and at least a third identification datum. For example, there are one second identification datum and one third identification datum. The first identification datum, the second identification datum, and the third identification datum may be e-mail addresses, but the present invention is not limited thereto. The intelligent mobile device 12 is wirelessly connected to the server 10. The intelligent mobile device 12 is installed with a remote control client APP program that that is able to verify the first identification datum. The first client device 14 is signally connected to the server 10 and installed with a first customer client APP program that is able to verify the second identification datum. For example, the first client device 14 is connected to the server 10 in a wireless or wired way. The server 10 is signally connected to the second client device 16. The second client device 16 is installed with a second customer client APP program that is able to verify the third identification datum. For example, the second client device 16 is connected to the server 10 in a wireless or wired way. Specifically, the remote control client APP program, the first customer client APP program, and the second customer client APP program are exemplified by chatting programs in the embodiment. The intelligent mobile device 12 may be a desktop, a smart phone, a tablet computer, or a notebook computer. The first client device 14 may be a desktop, a smart phone, a tablet computer, or a notebook computer. The second client device 16 may be a desktop, a smart phone, a tablet computer, or a notebook computer. In other words, each of the intelligent mobile device 12, the first client device 14, and the second client device 16 has a processor installing the APP program, at least a memory storing data, a communication interface connected to the server 10, and a display panel displaying data, wherein the communication interface may be a wired communication interface or a wireless communication interface. The processor is electrically connected to the memory, the communication interface, and the display panel. Besides, the display 18 is electrically connected to the first client device 14, and the display 20 is electrically connected to the second client device 16.

Figure 2:
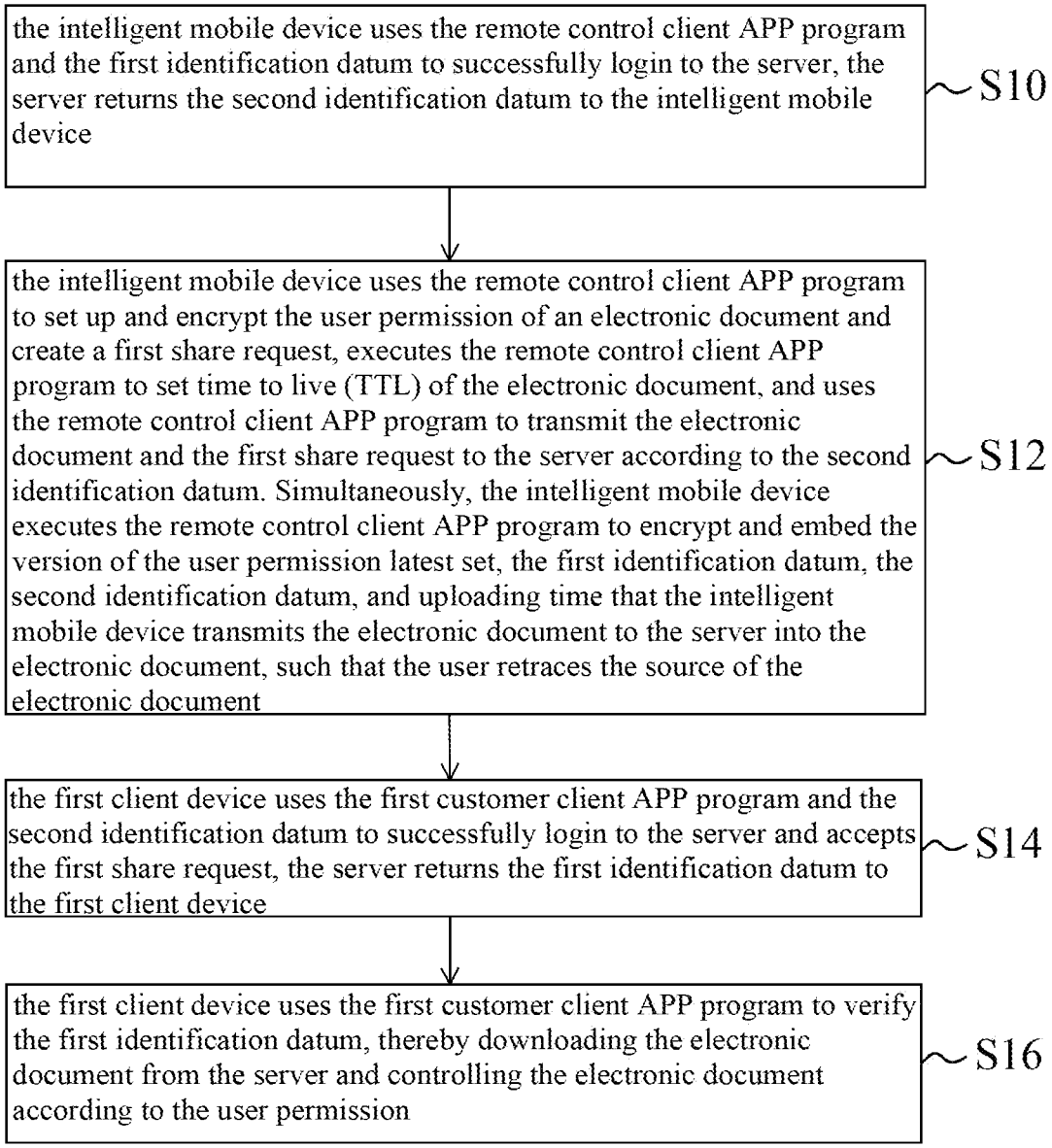
FIG. 2 is a flowchart of an intelligent mobile device sharing an electronic document according to an embodiment of the present invention.

The flowchart of the intelligent mobile device 12 sharing an electronic document is introduced as follows. Refer to FIG. 1 and FIG. 2. Firstly, in Step S10, the intelligent mobile device 12 uses the remote control client APP program and the first identification datum to successfully login to the server 10, the server 10 returns the second identification datum to the intelligent mobile device 12. Then, in Step S12, the intelligent mobile device 12 uses the remote control client APP program to set up and encrypt the user permission of an electronic document and create a first share request, executes the remote control client APP program to set time to live (TTL) of the electronic document, and uses the remote control client APP program to transmit the electronic document and the first share request to the server 10 according to the second identification datum. Simultaneously, the intelligent mobile device 12 executes the remote control client APP program to encrypt and embed the version of the user permission latest set, the first identification datum, the second identification datum, and uploading time that the intelligent mobile device 12 transmits the electronic document to the server 10 into the electronic document, such that the user retraces the source of the electronic document. Besides, the TTL may be permanent or temporary. The electronic document may be a presentation file, a portable document format (PDF) document, an image, a spreadsheet, a text document, or a scanned document. Then, in Step S14, the first client device 14 uses the first customer client APP program and the second identification datum to successfully login to the server 10 and accepts the first share request, the server 10 returns the first identification datum to the first client device 14. Finally, in Step S16, the first client device 14 uses the first customer client APP program to verify the first identification datum, thereby downloading the electronic document from the server 10 and controlling the electronic document according to the user permission. The time that the electronic document is stored in the first client device 14 depends on the TTL. When the TTL ends, the first customer client APP program automatically deletes the electronic document. If the TTL is permanent, the electronic document is permanently stored in the first client device 14.

The flowchart of the intelligent mobile device 12 initiating and terminating an on-line session is introduced as follows. Refer to FIG. 1 and FIG. 3. Firstly, in Step S18, the intelligent mobile device 12 actively executes the remote control client APP program to display the content of the electronic document and uses the remote control client APP program, the server 10, and the first customer client APP program to create and transmit a first attending request to the first client device 14 according to the second identification datum, thereby establishing a first on-line session. Then, in Step S20, the first client device 14 executes the first customer client APP program to display the content of the electronic document and uses the first customer client APP program, the server 10, and the remote control client APP program to transmit a first accepting message to the intelligent mobile device 12 according to the first identification datum when the first client device 14 accepts the first attending request. The intelligent mobile device 12 uses the second identification datum to attend the first on-line session according to the first accepting message. Since the content of the electronic document has a plurality of images, the process exceeds to Step S22 after the intelligent mobile device 12 uses the second identification datum to attend the first on-line session. In Step S22, the intelligent mobile device 12 uses a first control command to display the image corresponding to the first control command and uses the remote control client APP program, the server 10, and the first customer client APP program to transmit the first control command to the first client device 14 according to the second identification datum, such that the first client device 14 displays the image of the electronic document corresponding to the first control command. For example, the first control command may be a previous page command, a next page command, or a command of jumping to a page. Since the first control command is not a picture, the intelligent mobile device 12 can change the image displayed by the first client device 14 taking consideration of low bandwidth. This way, the intelligent mobile device 12 and the first client device 14 synchronously display the image of the electronic document. In addition, the first client device 14 may project the image of the electronic document to the screen of the display 18, such that viewers see the image of the electronic document displayed by the display 18. Since the remote control client APP program and the first customer client APP program are chatting application programs, the remote control client APP program or the first customer client APP program executes a chatting function when the first on-line session progresses. In addition, in order not to affect the other functions of the intelligent mobile device 12 or the first client device 14 used by the user, the remote control client APP program or the first customer client APP program adjusts the size of the window of the electronic document corresponded thereof when the first on-line session progresses. After the first client device 14 displays the image corresponding to the first control command, the process proceeds to Step S24. In Step S24, the first client device 14 uses the first customer client APP program, the server 10, and the remote control client APP program to transmit a first display message to the intelligent mobile device 12 according to the first identification datum, so as to inform the intelligent mobile device 12 of the image presently displayed by the first client device 14. Thus, the first on-line session successfully progresses. Then, in Step S26, the intelligent mobile device 12 uses the remote control client APP program, the server 10, and the first customer client APP program to transmit a terminating message to the first client device 14 according to the second identification datum, so as to close the window of the electronic document displayed by the first client device 14 after the intelligent mobile device 12 closes the window of the electronic document displayed by the intelligent mobile device 12 to terminate the first on-line session. The process proceeds to Step S28 after the first client device 14 closes the window of the electronic document displayed by the first client device 14. In Step S28, the first client device 14 uses the first customer client APP program, the server 10, and the remote control client APP program to transmit a responding message to the intelligent mobile device 12 according to the first identification datum.

The user permission has a plurality of modes and the plurality of modes have different priorities. For example, the user permission may be a presentation mode, a share mode, a read-only mode, or a session-only mode, wherein the priority of the presentation mode is higher than that of the share mode, the priority of the share mode is higher than that of the read-only mode, and the priority of the read-only mode is higher than that of the session-only mode.

Figure 4:
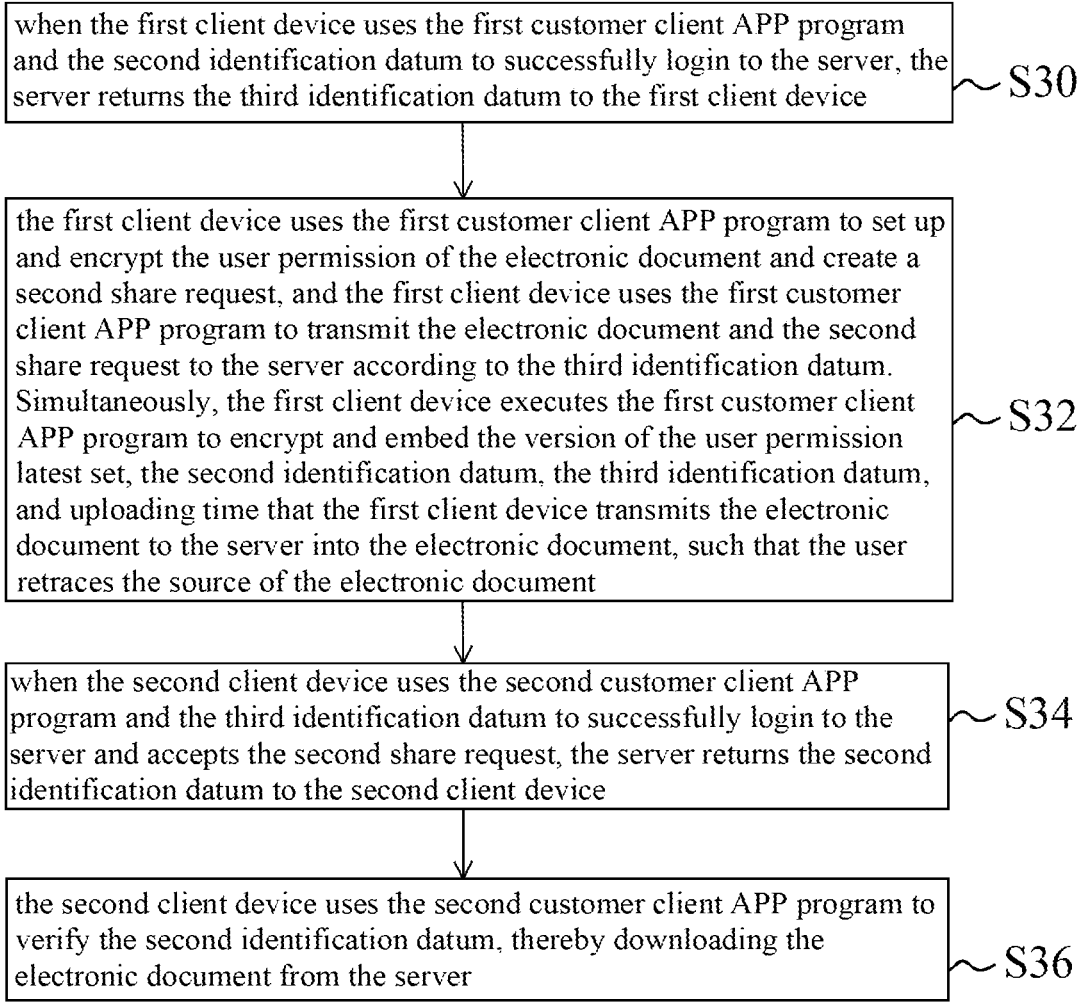
FIG. 4 is a flowchart of a first client device sharing an electronic document according to an embodiment of the present invention.

If the intelligent mobile device 12 set up the user permission of the electronic document to be the presentation mode, the first client device 14 may perform the following operations. The flowchart of the first client device 14 sharing the electronic document is introduced as follows. Refer to FIG. 1 and FIG. 4. Firstly, in Step S30, when the first client device 14 uses the first customer client APP program and the second identification datum to successfully login to the server 10, the server 10 returns the third identification datum to the first client device 14. Then, in Step S32, the first client device 14 uses the first customer client APP program to set up and encrypt the user permission of the electronic document and create a second share request, and the first client device 14 uses the first customer client APP program to transmit the electronic document and the second share request to the server 10 according to the third identification datum. Simultaneously, the first client device 14 executes the first customer client APP program to encrypt and embed the version of the user permission latest set, the second identification datum, the third identification datum, and uploading time that the first client device 14 transmits the electronic document to the server 10 into the electronic document, such that the user retraces the source of the electronic document. The first client device 14 only replaces the higher priority of the user permission with the lower priority. Since the original user permission is the presentation mode, the user permission keeps unchanged. Alternatively, the first client device 14 may modify the presentation mode into the share mode, the read-only mode, or the session-only mode. Then, in Step S34, when the second client device 16 uses the second customer client APP program and the third identification datum to successfully login to the server 10 and accepts the second share request, the server 10 returns the second identification datum to the second client device 16. Finally, in Step S36, the second client device 16 uses the second customer client APP program to verify the second identification datum, thereby downloading the electronic document from the server 10. The time that the electronic document is stored in the second client device 16 depends on the TTL.

Figure 5:
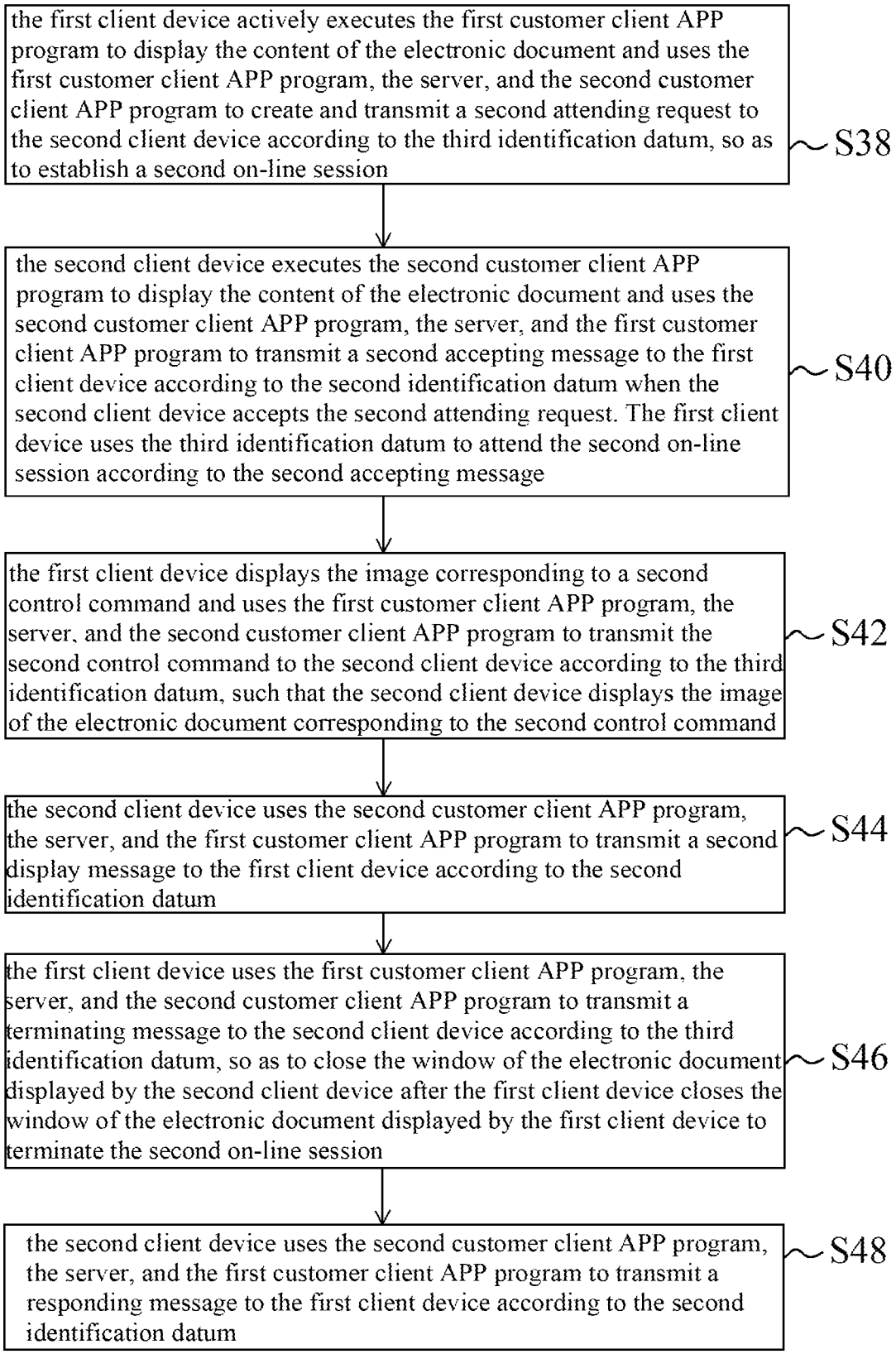
FIG. 5 is a flowchart of a first client device initiating and terminating an on-line session according to an embodiment of the present invention.

The flowchart of the first client device 14 initiating and terminating an on-line session is introduced as follows. Refer to FIG. 1 and FIG. 5. Firstly, in Step S38, the first client device 14 actively executes the first customer client APP program to display the content of the electronic document and uses the first customer client APP program, the server 10, and the second customer client APP program to create and transmit a second attending request to the second client device 16 according to the third identification datum, so as to establish a second on-line session. Then, in Step S40, the second client device 16 executes the second customer client APP program to display the content of the electronic document and uses the second customer client APP program, the server 10, and the first customer client APP program to transmit a second accepting message to the first client device 14 according to the second identification datum when the second client device 16 accepts the second attending request. The first client device 14 uses the third identification datum to attend the second on-line session according to the second accepting message. The process proceeds to Step S42 after the first client device 14 uses the third identification datum to attend the second on-line session. In Step S42, the first client device 14 displays the image corresponding to a second control command and uses the first customer client APP program, the server 10, and the second customer client APP program to transmit the second control command to the second client device 16 according to the third identification datum, such that the second client device 16 displays the image of the electronic document corresponding to the second control command. For example, the second control command may be a previous page command, a next page command, or a command of jumping to a page. Since the second control command is not a picture, the first client device 14 changes the image displayed by the second client device 16 taking consideration of low bandwidth. This way, the first client device 14 and the second client device 16 synchronously display the image of the electronic document. In addition, the second client device 16 may project the image of the electronic document to the screen of the display 20, such that viewers see the image of the electronic document displayed by the display 20. Since the first customer client APP program and the second customer client APP program are chatting application programs, the first customer client APP program or the second customer client APP program executes a chatting function when the second on-line session progresses. In addition, in order not to affect the other functions of the first client device 14 or the second client device 16 used by the user, the first customer client APP program or the second customer client APP program adjusts the size of the window of the electronic document corresponded thereof when the second on-line session progresses. The process proceeds to Step S44 after the second client device 16 displays the image corresponding to the second control command. In Step S44, the second client device 16 uses the second customer client APP program, the server 10, and the first customer client APP program to transmit a second display message to the first client device 14 according to the second identification datum, so as to inform the first client device 14 of the image presently displayed by the second client device 16. Thus, the second on-line session successfully progresses. Then, in Step S46, the first client device 14 uses the first customer client APP program, the server 10, and the second customer client APP program to transmit a terminating message to the second client device 16 according to the third identification datum, so as to close the window of the electronic document displayed by the second client device 16 after the first client device 14 closes the window of the electronic document displayed by the first client device 14 to terminate the second on-line session. The process proceeds to Step S48 after the second client device 16 closes the window of the electronic document displayed by the second client device 16. In Step S48, the second client device 16 uses the second customer client APP program, the server 10, and the first customer client APP program to transmit a responding message to the first client device 14 according to the second identification datum, so as to inform the first client device 14 the second client device 16 has closed the window of the electronic document.

If the intelligent mobile device 12 sets up the user permission of the electronic document to be the share mode, the first client device 14 performs the flowchart of FIG. 4 rather than operates in the presentation mode, the read-only mode, or the session-only mode. In addition, the first client device 14 keeps the share mode unchanged when the first client device 14 sets up the user permission. Alternatively, the first client device 14 sets up the user permission to be the read-only mode or the session-only mode. If the intelligent mobile device 12 sets up the user permission to be the read-only mode, the first client device 14 executes the first customer client APP program to display the content of the electronic document at any time. If the intelligent mobile device 12 sets up the user permission of the electronic document to be the session-only mode, the first customer client APP program automatically deletes the electronic document stored in the first client device 14 when the first session is terminated.

The intelligent mobile device 12 also transmits the electronic document to the second client device 16 through the server 10. When the intelligent mobile device 12 and the first client device 14 transmits the same electronic documents to the second client device 16, the second client device 16 has to decide to use the electronic document transmitted by the intelligent mobile device 12 or the first client device 14. As a result, in addition to setting up the user permission, the intelligent mobile device 12 and the first client device 14 also set up the replacing relationship of the priority of the user permission. For the first replacing relationship, two of the different priorities of the electronic document overwrite each other. For example, the intelligent mobile device 12 firstly transmits the electronic document having the presentation mode to the second client device 16. Afterwards, the first client device 14 transmits the electronic document having the share mode to the second client device 16. Thus, the second client device 16 uses the later-downloaded electronic document having the share mode, such that the share mode overwrites the presentation mode. For the second replacing relationship, only the low priority replaces the high priority. Continuing from the abovementioned example, the second client device 16 still uses the later-downloaded electronic document having the share mode since the priority of the share mode is lower than that of the presentation mode. For another example, the intelligent mobile device 12 firstly transmits the electronic document having the share mode to the second client device 16. Afterwards, the first client device 14 transmits the electronic document having the presentation mode to the second client device 16. Thus, the second client device 16 uses the earlier-downloaded electronic document having the share mode. For the third replacing relationship, the priority of the electronic document that is firstly downloaded is maintained. Specifically, the first client device 14 or the second client device 16 uses the first customer client APP program or the second customer client APP program to maintain the priority of the electronic document that is firstly downloaded. For example, the intelligent mobile device 12 firstly transmits the electronic document having the presentation mode to the second client device 16. Afterwards, the first client device 14 transmits the electronic document having the share mode to the second client device 16. Thus, the second client device 16 uses the earlier-downloaded electronic document having the presentation mode.

In conclusion, the present invention uses the remote control client APP program to set up the user permission and its priority of the electronic document, thereby enhancing the security of the electronic document.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A system for remotely controlling a document comprising:
    a server storing a first identification datum and at least a second identification datum;
    an intelligent mobile device installed with a remote control client APP program that is able to verify the first identification datum, and when the intelligent mobile device uses the remote control client APP program and the first identification datum to successfully login to the server, the server returns the second identification datum to the intelligent mobile device, the intelligent mobile device uses the remote control client APP program to set up a user permission of an electronic document and create a first share request, and the intelligent mobile device uses the remote control client APP program to transmit the electronic document and the first share request to the server according to the second identification datum; and
    at least a first client device installed with a first customer client APP program that is able to verify the second identification datum, and when the first client device uses the first customer client APP program and the second identification datum to successfully login to the server and accepts the first share request, the server returns the first identification datum to the first client device, and the first client device uses the first customer client APP program to verify the first identification datum, thereby downloading the electronic document from the server and controlling the electronic document according to the user permission;
    wherein the intelligent mobile device actively executes the remote control client APP program to display a content of the electronic document and uses the remote control client APP program, the server, and the first customer client APP program to create and transmit a first attending request to the first client device according to the second identification datum, thereby establishing a first on-line session, the first client device executes the first customer client APP program to display the content of the electronic document and uses the first customer client APP program, the server, and the remote control client APP program to transmit a first accepting message to the intelligent mobile device according to the first identification datum when the first client device accepts the first attending request, and the intelligent mobile device uses the second identification datum to attend the first on-line session according to the first accepting message; and the content of the electronic document has images, after the intelligent mobile device uses the second identification datum to attend the first on-line session, the intelligent mobile device uses a first control command to display the image corresponding to the first control command, and uses the remote control client APP program, the server, and the first customer client APP program to transmit the first control command to the first client device according to the second identification datum, and the first client device displays the image corresponding to the first control command, and the first control command is not a picture.

2. The system for remotely controlling the document according to claim 1, wherein the electronic document is a presentation file, a portable document format (PDF) document, an image, a spreadsheet, a text document, or a scanned document.

3. The system for remotely controlling the document according to claim 1, wherein the first control command is a previous page command, a next page command, or a command of jumping to a page.

4. The system for remotely controlling the document according to claim 1, wherein the first client device uses the first customer client APP program, the server, and the remote control client APP program to transmit a first display message to the intelligent mobile device according to the first identification datum after the first client device displays the image corresponding to the first control command.

5. The system for remotely controlling the document according to claim 4, wherein the intelligent mobile device uses the remote control client APP program, the server, and the first customer client APP program to transmit a terminating message to the first client device according to the second identification datum, so as to close a window of the electronic document displayed by the first client device after the intelligent mobile device closes a window of the electronic document displayed by the intelligent mobile device to terminate the first on-line session, and the first client device uses the first customer client APP program, the server, and the remote control client APP program to transmit a responding message to the intelligent mobile device according to the first identification datum after the first client device closes the window of the electronic document displayed by the first client device.

6. The system for remotely controlling the document according to claim 4, further comprising at least a display electrically connected to the first client device, and the first client device projects the image of the electronic document to a screen of the display.

7. The system for remotely controlling the document according to claim 4, further comprising at least a second client device installed with a second customer client APP program, when the user permission is a presentation mode, the server further stores at least a third identification datum, the second customer client APP program is able to verify the third identification datum, when the first client device uses the first customer client APP program and the second identification datum to successfully login to the server, the server returns the third identification datum to the first client device, the first client device uses the first customer client APP program to set up the user permission of the electronic document and create a second share request, and the first client device uses the first customer client APP program to transmit the electronic document and the second share request to the server according to the third identification datum, when the second client device uses the second customer client APP program and the third identification datum to successfully login to the server and accepts the second share request, the server returns the second identification datum to the second client device, and the second client device uses the second customer client APP program to verify the second identification datum, thereby downloading the electronic document from the server; the first client device executes the first customer client APP program to encrypt the user permission of the electronic document; the first client device actively executes the first customer client APP program to display the content of the electronic document and uses the first customer client APP program, the server, and the second customer client APP program to create and transmit a second attending request to the second client device according to the third identification datum, so as to establish a second on-line session, when the second client device accepts the second attending request, the second client device executes the second customer client APP program to display the content of the electronic document and uses the second customer client APP program, the server, and the first customer client APP program to transmit a second accepting message to the first client device according to the second identification datum, and the first client device uses the third identification datum to attend the second on-line session according to the second accepting message; after the first client device uses the third identification datum to attend the second on-line session, the first client device displays the image corresponding to a second control command and uses the first customer client APP program, the server, and the second customer client APP program to transmit the second control command to the second client device according to the third identification datum, the second client device displays the image corresponding to the second control command, and the second control command is not a picture; and after the second client device displays the image corresponding to the second control command, the second client device uses the second customer client APP program, the server, and the first customer client APP program to transmit a second display message to the first client device according to the second identification datum.

8. The system for remotely controlling the document according to claim 7, wherein the second client device is a desktop, a smart phone, a tablet computer, or a notebook computer, and the first client device is a desktop, a smart phone, a tablet computer, or a notebook computer.

9. The system for remotely controlling the document according to claim 7, wherein the remote control client APP program, the first customer client APP program, and the second customer client APP program are chatting application programs.

10. The system for remotely controlling the document according to claim 9, wherein when the first on-line session progresses, the chatting programs execute chatting functions.

11. The system for remotely controlling the document according to claim 9, wherein when the first on-line session progresses, the remote control client APP program or the first customer client APP program adjusts a size of a window of a corresponding the electronic document.

12. The system for remotely controlling the document according to claim 4, further comprising at least a second client device installed with a second customer client APP program, when the user permission is a share mode, the server further stores at least a third identification datum, the second customer client APP program is able to verify the third identification datum, when the first client device uses the first customer client APP program and the second identification datum to successfully login to the server, the server returns the third identification datum to the first client device, the first client device uses the first customer client APP program to set up the user permission of the electronic document and create a second share request, and the first client device uses the first customer client APP program to transmit the electronic document and the second share request to the server according to the third identification datum, when the second client device uses the second customer client APP program and the third identification datum to successfully login to the server and accepts the second share request, the server returns the second identification datum to the second client device, and the second client device uses the second customer client APP program to verify the second identification datum, thereby downloading the electronic document from the server.

13. The system for remotely controlling the document according to claim 4, wherein when the user permission is a read-only mode, the first client device executes the first customer client APP program to display the content of the electronic document at any time; and when the user permission is a session-only mode and the first on-line session is terminated, the first customer client APP program automatically deletes the electronic document stored in the first client device.

14. The system for remotely controlling the document according to claim 1, wherein the user permission has a plurality of modes, the plurality of modes have different priorities, and two of the different priorities of the electronic document overwrite each other.

15. The system for remotely controlling the document according to claim 1, wherein the user permission has a plurality of modes, the plurality of modes have different priorities, and only a low the priority replaces a high the priority.

16. The system for remotely controlling the document according to claim 1, wherein the user permission has a plurality of modes, the plurality of modes have different priorities, and the first client device uses the first customer client APP program to maintain the priority of the electronic document that is firstly downloaded.

17. The system for remotely controlling the document according to claim 1, wherein the intelligent mobile device executes the remote control client APP program to encrypt and embed the first identification datum, the second identification datum, and the uploading time into the electronic document.

18. The system for remotely controlling the document according to claim 1, wherein the intelligent mobile device executes the remote control client APP program to set time to live (TTL) of the electronic document.

19. The system for remotely controlling the document according to claim 1, wherein the intelligent mobile device executes the remote control client APP program to encrypt the user permission of the electronic document.

* * * * *